(12) United States Patent
Kazama (10) Patent No.: US 11,480,942 B2
(45) Date of Patent: Oct. 25, 2022

(54) SUPPORTING APPARATUS AND NON-TRANSITORY COMPUTER READABLE MEDIUM STORING PROGRAM

(71) Applicant: FUJIFILM Business Innovation Corp., Tokyo (JP)

(72) Inventor: Atsuo Kazama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 599 days.

(21) Appl. No.: 16/352,881

(22) Filed: Mar. 14, 2019

(65) Prior Publication Data
US 2019/0346826 A1 Nov. 14, 2019

(30) Foreign Application Priority Data

May 14, 2018 (JP) .............................. JP2018-093300

(51) Int. Cl.
*G05B 19/4097* (2006.01)

(52) U.S. Cl.
CPC .................... *G05B 19/4097* (2013.01); *G05B 2219/35081* (2013.01)

(58) Field of Classification Search
None
See application file for complete search history.

(56) References Cited

U.S. PATENT DOCUMENTS

2018/0275634 A1 * 9/2018 McFarland ........ G05B 19/4099

FOREIGN PATENT DOCUMENTS

| JP | 2002149708 | 5/2002 |
| JP | 2003316860 | 11/2003 |
| JP | 2004054358 | 2/2004 |
| JP | 2006031360 | 2/2006 |

* cited by examiner

*Primary Examiner* — Sean Shechtman
(74) *Attorney, Agent, or Firm* — JCIPRNET (57) ABSTRACT

A design supporting apparatus includes an acquisition unit that acquires information regarding a design change, and an output unit that outputs information indicating that the design change is able to be coped with in a case where the design change is able to be coped with through replacement of a tool or a component with respect to a facility in the current manufacturing line, and outputs information indicating that the design change is not able to be coped with in a case where the design change is not able to be coped with even through replacement of the tool or the component with respect to the facility in the current manufacturing line.

5 Claims, 9 Drawing Sheets

| FACILITY | | TOOL/COMPONENT | RANGE | WORKPIECE | SIZE OF WORKPIECE | PROCESSING |
|---|---|---|---|---|---|---|
| LATHE A | CURRENT | RIGHT SINGLE-EDGED BITE A | PRODUCT | ROUND BAR | LENGTH OF 220 mm AND DIAMETER OF 50 mm | CUTTING BY 12 mm |
| | REPLACEMENT | RIGHT SINGLE-EDGED BITE B | COPABLE RANGE | ROUND BAR | MAXIMA OF LENGTH OF 250 mm AND DIAMETER OF 80 mm | CUTTING BY UP TO 20 mm |
| | REPLACEMENT | RIGHT SINGLE-EDGED BITE B | COPABLE RANGE | ROUND BAR | MAXIMA OF LENGTH OF 250 mm AND DIAMETER OF 80 mm | CUTTING BY UP TO 40 mm |
| | REPLACEMENT | PROTRUDING BLADE BITE | COPABLE RANGE | ROUND BAR | MAXIMA OF LENGTH OF 250 mm AND DIAMETER OF 80 mm | CUTTING BY UP TO 20 mm |
| | REPLACEMENT | BORING BAR TOOL | COPABLE RANGE | ROUND BAR | MAXIMA OF LENGTH OF 250 mm AND DIAMETER OF 80 mm | CUTTING BY UP TO 50 mm |
| MILLING MACHINE | CURRENT | | PRODUCT | PLATE | WIDTH OF 300 mm, LENGTH OF 200 mm, AND THICKNESS OF 7 mm | GROOVING BY 2 mm WIDE AND 2 mm DEEP |
| | REPLACEMENT | | COPABLE RANGE | PLATE | WIDTH OF 10 TO 900 mm, LENGTH OF 10 TO 600 mm, AND THICKNESS OF 5 TO 40 mm | GROOVING BY UP TO 5 mm DEEP AT 2 mm WIDE |
| | REPLACEMENT | | COPABLE RANGE | PLATE | | GROOVING BY UP TO 5 mm DEEP AT 1 mm WIDE |
| | REPLACEMENT | | COPABLE RANGE | PLATE | | GROOVING BY UP TO 10 mm DEEP AT 3 mm WIDE |
| DRILLING MACHINE | CURRENT | DRILL BIT HAVING DIAMETER OF 10 mm | PRODUCT | PLATE | | BORING BY 20 mm DEEP |
| | REPLACEMENT | DRILL BIT HAVING DIAMETER OF 0.5 mm | COPABLE RANGE | PLATE | | BORING BY UP TO 50 mm DEEP |
| | REPLACEMENT | DRILL BIT HAVING DIAMETER OF 1.0 mm | COPABLE RANGE | PLATE | | BORING BY UP TO 50 mm DEEP |
| | REPLACEMENT | DRILL BIT HAVING DIAMETER OF 1.5 mm | COPABLE RANGE | PLATE | | BORING BY UP TO 30 mm DEEP |
| | REPLACEMENT | DRILL BIT HAVING DIAMETER OF 2.0 mm | COPABLE RANGE | PLATE | | BORING BY UP TO 30 mm DEEP |
| | REPLACEMENT | DRILL BIT HAVING DIAMETER OF 2.5 mm | COPABLE RANGE | PLATE | | BORING BY UP TO 50 mm DEEP |
| | REPLACEMENT | DRILL BIT HAVING DIAMETER OF 15.0 mm | COPABLE RANGE | PLATE | | BORING BY UP TO 50 mm DEEP |
| | REPLACEMENT | HOLE CUTTER HAVING DIAMETER OF 30.0 mm | COPABLE RANGE | PLATE | | BORING BY UP TO 100 mm DEEP |
| | REPLACEMENT | HOLE CUTTER HAVING DIAMETER OF 50.0 mm | COPABLE RANGE | PLATE | | BORING BY UP TO 15 mm DEEP |
| | REPLACEMENT | HOLE CUTTER HAVING DIAMETER OF 100.0 mm | COPABLE RANGE | PLATE | | BORING BY UP TO 30 mm DEEP |
| | REPLACEMENT | | COPABLE RANGE | PLATE | | BORING BY UP TO 100 mm DEEP |
| | REPLACEMENT | CIRCLE CUTTER HAVING DIAMETER OF 40 TO 200 mm | COPABLE RANGE | PLATE | | BORING BY UP TO 15 mm DEEP |

|  | CURRENT PRODUCT |
|---|---|
| FACILITY | LATHE A |
| TOOL/COMPONENT | RIGHT SINGLE-EDGED BITE A |

| | BEFORE DESIGN CHANGE (CURRENT PRODUCT) | AFTER DESIGN CHANGE |
|---|---|---|
| FACILITY | LATHE A | COPABLE WITH LATHE A |
| TOOL/COMPONENT | RIGHT SINGLE-EDGED BITE A | COPABLE WITH RIGHT SINGLE-EDGED BITE A |
| REPLACEMENT NECESSITY | | REPLACEMENT NOT NECESSARY |

| | BEFORE DESIGN CHANGE (CURRENT PRODUCT) | AFTER DESIGN CHANGE |
|---|---|---|
| FACILITY | LATHE A | COPABLE WITH LATHE A |
| TOOL /COMPONENT | RIGHT SINGLE-EDGED BITE A | COPABLE WITH RIGHT SINGLE-EDGED BITE A AND BORING TOOL BAR (POSSESSED) |
| REPLACEMENT NECESSITY | | REPLACEMENT NECESSARY |

|  | BEFORE DESIGN CHANGE (CURRENT PRODUCT) | AFTER DESIGN CHANGE |
|---|---|---|
| FACILITY | LATHE A | COPABLE WITH LATHE A COPABLE WITH NEW CHUCK (REQUIRED TO BE PURCHASED) |
| TOOL /COMPONENT | RIGHT SINGLE-EDGED BITE A | COPABLE WITH RIGHT SINGLE-EDGED BITE A AND NEW BITE (REQUIRED TO BE PURCHASED) |
| REPLACEMENT NECESSITY |  | REPLACEMENT NECESSARY |

SUPPORTING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-093300 filed May 14, 2018.

BACKGROUND

(i) Technical Field

The present invention relates to a design supporting apparatus and a non-transitory computer readable medium storing a program.

(ii) Related Art

JP2006-031360A discloses a production line plan supporting apparatus that includes a production simulation unit 11 which simulates a production line operation on the basis of production line plan information, and a measures analysis unit 12 which selects at least one facility with the production ability and/or investment expenditure to be required in order to allow a simulation result to be close to target production ability and target investment expenditure from a measures information storage unit 15, and outputs the facility to the production simulation unit, in which a simulation is re-performed with the facility which is selected by the measures analysis unit 12 such that the facility with the optimum production ability and investment expenditure is automatically selected with respect to the plan of the production line.

JP2003-316860A discloses a facility personnel plan design apparatus that includes a unit which stores a relationship between an investment amount of quantitative extension and a production capability, a unit which stores a relation between an investment amount of qualitative improvement and a production capability, and a unit which calculates the current cost required for product production, and that realizes a production plan for calculating an investment plan indicating the investment amount and time of quantitative extension and the investment amount and time of qualitative improvement such that a sum total of the investment amount of quantitative extension, the investment amount of qualitative improvement, and the current cost required for product production is the minimum.

JP2004-054358A discloses a capital investment evaluation system in which a conventional model using a current facility in the plant and a newly-devised model produced by increasing/decreasing the current facility are created, and production situations in respective models are simulated with a simulator on the basis of data regarding workers and a model to be produced, and data regarding a production amount. Costs required for both models are calculated on the basis of a simulation result, the costs are compared to evaluate the newly-devised model with respect to the conventional model, and thus it is determined whether or not the increase/decrease of facilities is to be performed.

JP2002-149708A discloses a product design supporting system that includes a database which stores questions, influence degrees, and the like, for each product, a product selection unit which selects a product to be evaluated from the database, an evaluation method selection unit which selects one of evaluation methods for the product to be evaluated, an evaluation execution unit which evaluates the respective components constituting the product according to the selected evaluation method, an influence degree calculation unit which calculates the degree of influence on assembly according to the result of an answer to a question, and a display device which displays the degree of influence or the like.

SUMMARY

Meanwhile, in a case where design of a product is finished, a manufacturing line for manufacturing the product is built, and manufacturing of the product is started. The design of the product for which the manufacturing line is built may be changed. In this case, the product of which the design is changed may be manufactured in the built manufacturing line (the current manufacturing line). Thus, it is necessary to understand whether or not a design change to be performed is within a copable range without rebuilding the manufacturing line before the design change is completed.

Aspects of non-limiting embodiments of the present disclosure relate to a design supporting apparatus and a non-transitory computer readable medium storing a program, capable of understanding whether or not a design change is within a copable range without rebuilding a manufacturing line before the design change is completed, compared with a case of not outputting information indicating that the design change can be coped with or information indicating that the design change cannot coped with.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a design supporting apparatus including an acquisition unit that acquires information regarding a design change; and an output unit that outputs information indicating that the design change is able to be coped with in a case where the design change is able to be coped with through replacement of a tool or a component with respect to a facility in the current manufacturing line, and outputs information indicating that the design change is not able to be coped with in a case where the design change is not able to be coped with even through replacement of the tool or the component with respect to the facility in the current manufacturing line.

BRIEF DESCRIPTION OF THE DRAWINGS

Exemplary embodiment(s) of the present invention will be described in detail based on the following figures, wherein:

FIG. 3 is a diagram illustrating an example of facility information accumulated in a facility information DB;

FIGS. 5A and 5B are diagrams for explaining a wooden doll as a current product which is being manufactured, in which FIG. 5A illustrates three orthographic views displayed on a display screen of a display device, and FIG. 5B illustrates a facility and the like used for manufacturing;

FIGS. 6A and 6B are diagrams for explaining the wooden doll of which design is changed, in which FIG. 6A illustrates three orthographic views displayed on the display screen of the display device, and FIG. 6B illustrates a facility and the like before and after the design change;

FIGS. 7A and 7B are diagrams for explaining the wooden doll of which design is changed, in which FIG. 7A illustrates three orthographic views displayed on the display screen of the display device, and FIG. 7B illustrates a facility and the like before and after the design change;

FIGS. 8A and 8B are diagrams for explaining the wooden doll of which design is changed, in which FIG. 8A illustrates three orthographic views displayed on the display screen of the display device, and FIG. 8B illustrates a facility and the like before and after the design change; and FIGS. 9A and 9B are diagrams for explaining the wooden doll of which design is changed, in which FIG. 9A illustrates three orthographic views displayed on the display screen of the display device, and FIG. 9B illustrates a facility and the like before and after the design change.

DETAILED DESCRIPTION

Herein, a state is assumed in which design of a product is finished, and a manufacturing line for manufacturing the product is already built. This corresponds to a state in which manufacturing of the product is started, a state right before manufacturing is started, or a state in which the product has been manufactured in the past. In any case, facilities required for manufacturing are introduced, and thus the manufacturing line is already built. The manufacturing line is a series of work processes for manufacturing a product, and is provided with a facility correlated with each work process.

In this state, in a case where a design change is performed on the product, there is a case where the built manufacturing line may not cope with manufacturing of the product. In a case where it is recognized that the design change is performed in a range in which the current facility cannot cope with the design change in a stage of starting manufacturing of the product after the design change is completed, it is necessary to perform a design change again or to rebuild a manufacturing line. In either case, cost and time (period) are required, and thus putting of the product on the market is delayed.

Therefore, in the present embodiment, it is possible to understand whether or not a design change performed by a designer is within a copable range with a built manufacturing line before the design change is completed, by using the design supporting apparatus. Hereinafter, an exemplary embodiment of the invention will be described in detail with reference to the accompanying drawings.

Design System 1

Figure 1:
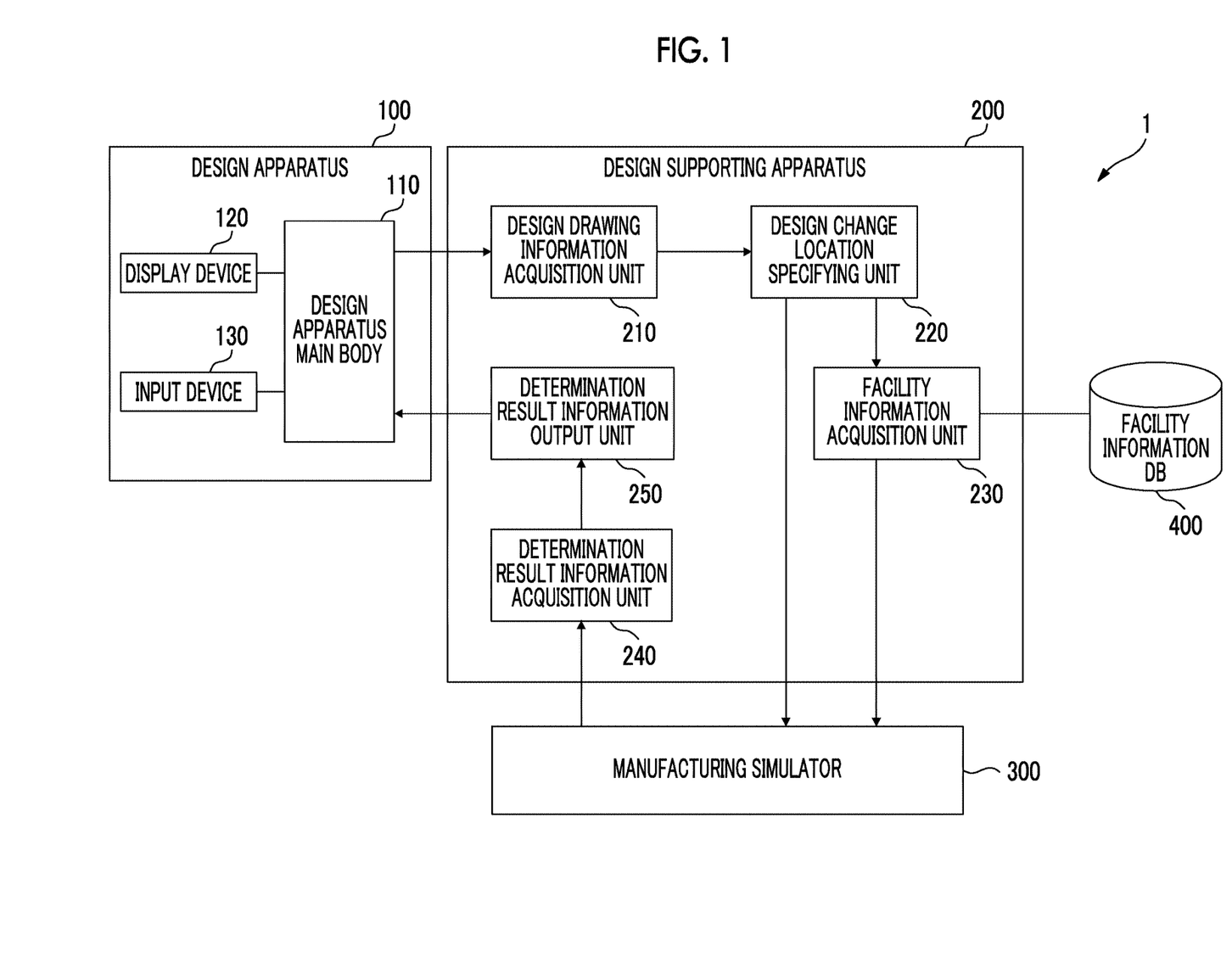
FIG. 1 is a diagram for explaining a design system designing a product.

FIG. 1 is a diagram for explaining a design system 1 designing a product. The design system 1 comprises a design apparatus 100, a design supporting apparatus 200, a manufacturing simulator 300, and a facility information database (hereinafter, referred to as a facility information DB) 400.

FIG. 1 illustrates functional blocks with respect to the design supporting apparatus 200. Here, the design apparatus 100 is an example of a design drawing creation unit, and the manufacturing simulator 300 is an example of a simulation unit.

The design apparatus 100 is a processing unit used for a designer to design a product to be manufactured from now on. The design apparatus 100 comprises a design apparatus main body 110, a display device 120, and an input device 130. The design apparatus 100 is configured with a computer having the same hardware configuration as that of the design supporting apparatus 200 illustrated in FIG. 3 which will be described later. Application software for causing the design apparatus 100 to function as a so-called computer-aided design (CAD) terminal is installed in the design apparatus 100. Here, the display device 120 is an example of a display unit.

The display device 120 of the design apparatus 100 is a display unit displaying information, such as a display using liquid crystal or organic EL. The input device 130 of the design apparatus 100 is an input unit which is, for example, a keyboard, a mouse, or a tablet, and is used to input information such as a command. A designer operates the input device 130 while viewing a design drawing or the like displayed on the display device 120, and designs a product to be manufactured from now on by using the design apparatus main body 110. In other words, the designer creates a design drawing of the product to be manufactured from now on by using the design apparatus 100.

As described above, the designer performs a design change on the product for which the manufacturing line is already built. Therefore, the designer creates a design drawing in which design is changed on the basis of a design drawing of the product for which the manufacturing line is built. Here, the product for which the manufacturing line is built is referred to as the current product, and the design drawing thereof is referred to as a design drawing before a design change. A design drawing of the product of which design is changed is referred to as a design drawing after a design change.

A design drawing created in the design apparatus 100 is sent to other apparatuses (for example, the design supporting apparatus 200 and the manufacturing simulator 300) as information (electronic data). Therefore, a design drawing as information may be referred to as design drawing information. A design drawing and design drawing information may be used without being differentiated from each other.

The design supporting apparatus 200 is a processing apparatus supporting design of a product performed by the designer. The design supporting apparatus 200 is configured with a computer having a hardware configuration illustrated in FIG. 2 which will be described later. Application software for realizing a function of supporting design is installed in the design supporting apparatus 200. A function of the design supporting apparatus 200 will be described later.

The manufacturing simulator 300 is a processing apparatus which simulates manufacturing of a product on the basis of a design drawing of the product. The manufacturing simulator 300 simulates a manufacturing line required for manufacturing of the product, facilities required in the manufacturing line, or the like on the basis of the design drawing of the product. In a case where a location (design change location) on which a design change is to be performed and a facility related to the design change are acquired, the manufacturing simulator 300 determines whether or not a product after the design change can be manufactured by the facility.

The facility information DB 400 accumulates information regarding a facility provided in a manufacturing line from which the current product is manufactured. The information regarding a facility includes information regarding a facility (current facility) correlated with a work process forming the current manufacturing line from which the product is manufactured, information regarding a copable range with the current facility, and information regarding a copable range through replacement of a tool or a component possessed (held) by the current facility. Here, such information is referred to as facility information. For example, in a case where a facility is a lathe, a tool is a member which is not worn out, such as a chuck which holds a workpiece. On the other hand, a component is a member (expendable member) which is worn out due to the use thereof, such as a bite cutting a workpiece.

Here, the design apparatus 100, the design supporting apparatus 200, the manufacturing simulator 300, and the facility information DB 400 are not necessarily configured with separate apparatuses. For example, the application software for realizing a function of the design supporting apparatus 200 may be installed in the design apparatus 100. In other words, the design apparatus 100 may also be used as the design supporting apparatus 200. The application software for realizing a function of the manufacturing simulator 300 may be installed in the design supporting apparatus 200. In other words, the design supporting apparatus 200 may also be used as the manufacturing simulator 300. The application software for realizing a function of the manufacturing simulator 300 may be installed in the design apparatus 100 along with the application software for realizing a function of the design supporting apparatus 200. In other words, the design apparatus 100 may also be used as the design supporting apparatus 200 and the manufacturing simulator 300.

In FIG. 1, the design apparatus 100, the design supporting apparatus 200, and the manufacturing simulator 300 are separately illustrated, but both of the design supporting apparatus 200 and the manufacturing simulator 300 illustrated in FIG. 1 may be used as a design supporting apparatus. Both of the design apparatus 100 and the design supporting apparatus 200 illustrated in FIG. 1 may be used as a design supporting apparatus. All of the design apparatus 100, the design supporting apparatus 200, and the manufacturing simulator 300 may be used as a design supporting apparatus. The above-described design supporting apparatus may further include the facility information DB 400.

The design apparatus 100, the design supporting apparatus 200, the manufacturing simulator 300, and the facility information DB 400 may be connected to each other not only via a local area network (LAN) but also via a metropolitan area network (MAN), a wide area network (WAN), a wired network or a wireless network used in the Internet or an intranet, or a composite of the networks.

Design Supporting Apparatus 200

With reference to FIG. 1, a description will be made of functional blocks of the design supporting apparatus 200 to which the present exemplary embodiment is applied.

The design supporting apparatus 200 comprises a design drawing information acquisition unit 210, a design change location specifying unit 220, a facility information acquisition unit 230, a determination result information acquisition unit 240, and a determination result information output unit 250. Here, the design drawing information acquisition unit 210 and the design change location specifying unit 220 are an example of an acquisition unit, the facility information acquisition unit 230 is an example of another acquisition unit, the determination result information acquisition unit 240 is an example of still another acquisition unit, and the determination result information output unit 250 is an example of an output unit.

The design drawing information acquisition unit 210 acquires information regarding a design drawing created by the designer from the design apparatus 100. Herein, the designer performs a design change, and thus design drawing information includes information regarding a design drawing before the design change and information regarding a design drawing after the design change.

The design change location specifying unit 220 extracts a difference between the pieces of information regarding the design drawings before and after the design change, acquired by the design drawing information acquisition unit 210, and specifies the difference as a design change location.

The facility information acquisition unit 230 retrieves information (facility information) regarding a facility related to the design change (design change location) from facility information accumulated in the facility information DB 400 on the basis of the design change location specified by the design change location specifying unit 220, and acquires the facility information. The facility information related to the design change is information regarding a facility correlated with a work process of a manufacturing line from which the current product before the design change is manufactured, and is information regarding a facility related to a design change portion. The information will be described later in detail.

Here, the manufacturing simulator 300 acquires information (design change location information) regarding the design change location specified by the design change location specifying unit 220 and the facility information related to the design change location acquired by the facility information acquisition unit 230, and determines whether or not the design change is within a copable range with the current facility. Regarding a determination result in the manufacturing simulator 300, for example, in a case where the design change is within a copable range with the current facility, "copable" is determined. In a case where the design change is within a copable range through replacement of a possessed tool or component, "copable through replacement" is determined. In a case where the design change is not within a copable range with the current facility, and is not within a capable range even through replacement of a tool or a component, "not copable" is determined. In a case where it cannot be determined whether or not the design change is within a copable range with the current facility, "determination impossible" is determined. A case where "not copable" is determined is a case where the design change exceeds a copable range (boundary) with the current facility and also exceeds a copable range (boundary) through replacement of a tool or a component (a case where the design change is not within a copable range).

The determination result information acquisition unit 240 acquires information regarding a result of the determination (determination result) of whether or not the design change is within a copable range with the current facility from the manufacturing simulator 300.

The determination result information output unit 250 sends the information regarding the determination result acquired by the determination result information acquisition unit 240, to the design apparatus 100.

The design apparatus 100 displays the determination result on the display device 120 on the basis of the information regarding the determination result acquired from the determination result information output unit 250. The determination result may be indicated by a color of a determination result display box (a determination result display box 112 in a display screen 121 illustrated in FIG. 5A or the like which will be described later) provided in a display screen (the display screen 121 illustrated in FIG. 5A or the like which will be described later) on which a design drawing after the design change is displayed. For example, "copable" may be displayed green, "copable through replacement" may be displayed yellow, "not copable" may be displayed red, and "determination impossible" may be displayed violet. The determination result is displayed in a color is displayed on the display screen of the display device 120 along with a design drawing on which the design change is to be performed, and thus the designer can easily recognize the determination result. The determination result may be displayed to be arranged with the design drawing, and may be displayed to overlap the design drawing. The determination result may be displayed not only in a color but also in text or in a sound. A combination thereof may be used.

The designer visually recognizes the determination result displayed on the display device 120, and thus understands whether or not the performed design change is within a copable range with the current facility. In a case where "not copable" is determined for the design change, a design change can be performed again such that "copable" or "copable through replacement" is determined by performing a new design change. In other words, it is possible to understand whether or not a design change is within a copable range without rebuilding a manufacturing line in a stage before the design change is completed. Consequently, it is possible to prevent the occurrence of a situation in which a design change is not within a copable range with the current facility in a stage in which a product starts to be manufactured after the design change is completed.

Here, a description will be made of a timing at which the design supporting apparatus 200 is used.

In a case where the designer performs design change work, the designer may give an instruction (information) for requesting a determination to the design apparatus 100 at a timing at which the designer wants to know the determination of whether or not a design change desired to be performed is within a capable range with the current facility. In this case, design drawing information before and after the design change is sent from the design apparatus 100 to the design supporting apparatus 200. Consequently, the design supporting apparatus 200 outputs a determination result for the design change performed on the basis of the acquired design drawing information.

The design supporting apparatus 200 may acquire a design change performed in the design apparatus 100, that is, design drawing information before and after the design change at a predefined timing, and may output a determination result for the performed design change. The predefined timing is a timing at which, for example, the designer changes a part of the design drawing before the design change. The determination result for the performed design change is output at a timing at which the designer changes a part of the design drawing before the design change, and thus a rework amount required for the designer to perform a design change again is reduced.

The predefined timing may be a timing which is set at a predefined time interval, a timing at which there is no operation at a predefined time after the designer performs a series of design change operations, a timing at which the designer preserves a file regarding a design drawing, or the like. As mentioned above, the design supporting apparatus 200 acquires design drawing information at a predefined timing, and outputs a determination result, and thus a rework amount required for the designer to perform a design change again is reduced. In a case of the timing at which the designer preserves a file regarding a design drawing, the designer will understand a determination result when the designer opens the file next. Even in this case, in a case where the designer understands a determination result before the designer completes a design change, a rework amount required for the designer to perform a design change again is reduced.

Hardware Configuration

Figure 2:
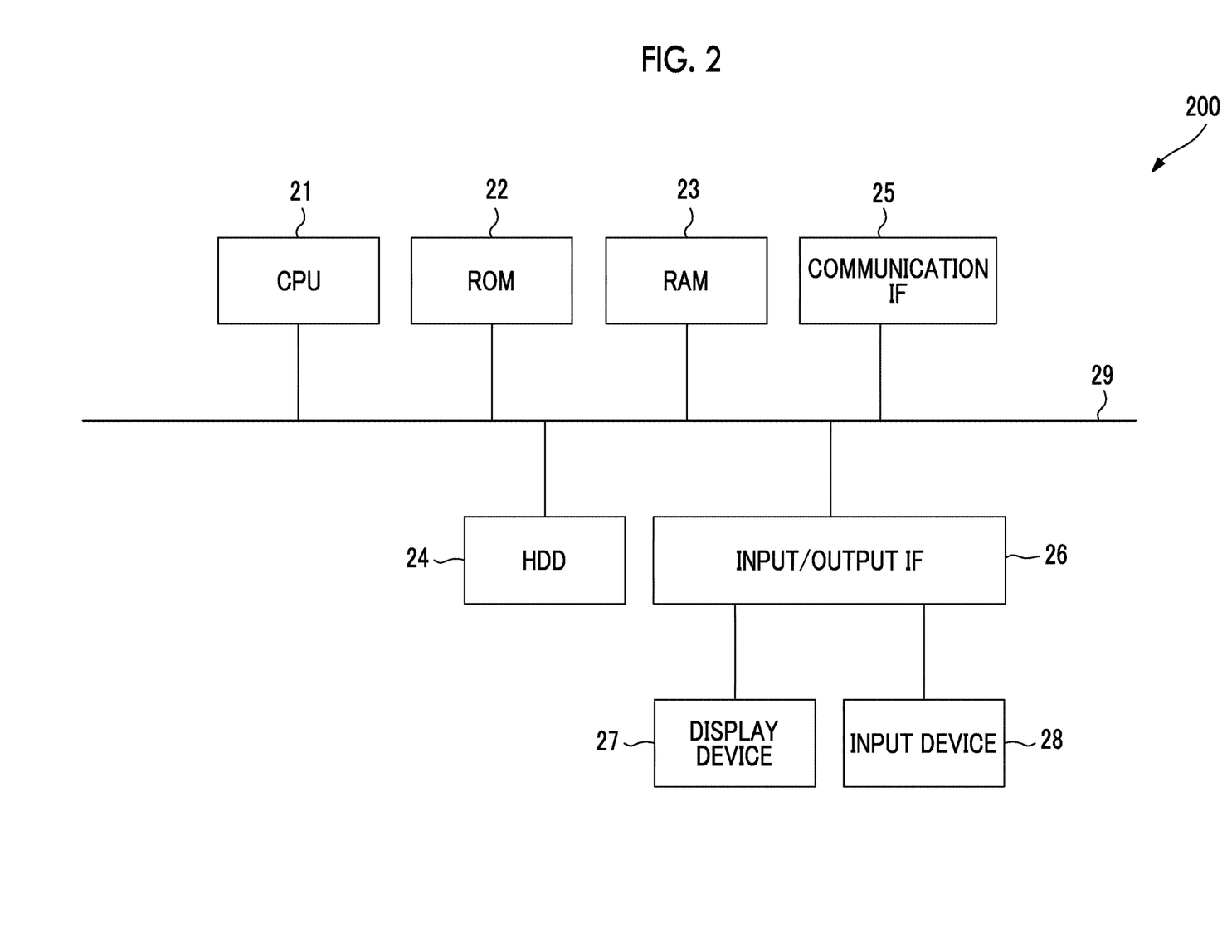
FIG. 2 is a diagram for explaining an example of a hardware configuration of a design supporting apparatus.

FIG. 2 is a diagram for explaining an example of a hardware configuration of the design supporting apparatus 200. As described above, the design supporting apparatus 200 is configured with a computer.

The design supporting apparatus 200 comprises a CPU 21, a ROM 22, a RAM 23, an HDD 24, a communication input/output interface (communication IF) 25, an input/output interface (input/output IF) 26, a display device 27 connected to the input/output IF 26, an input device 28 connected to the input/output IF 26, and a bus 29. The design supporting apparatus 200 may not comprise the display device 27 and/or the input device 28.

The ROM 22 is a nonvolatile memory which holds stored (written) data even in a case where there is no supply of power. The ROM 22 is, for example, an EPROM, EEPROM, or a flash memory. The ROM 22 stores application software (program) for causing the computer to operate as the design supporting apparatus 200, and data such as initial values of constants or variables used for the program.

The RAM 23 is a volatile memory in which stored data is lost in a case where power is not supplied. The RAM 23 is faster in reading and writing of data than the ROM 22. The RAM 23 is, for example, a DRAM. The RAM 23 is used as a work area in which the program or the data stored in the ROM 22 is read and is developed in an executable state, and data for operating the design supporting apparatus 200 is stored.

The HDD 24 is a rewritable nonvolatile memory which holds stored (written) data even in a case where there is no supply of power, and stores a large volume of data. In the same manner as ROM 22, the HDD 24 may store application software (program) for causing the computer to operate as the design supporting apparatus 200, and data such as initial values of constants or variables used for the program.

The bus 29 is connected to the CPU 21, the ROM 22, the RAM 23, the HDD 24, the communication IF 25, and the input/output IF 26, and allows a program or data to be input and output under the control of the CPU 21.

The communication IF 25 is an interface between the design supporting apparatus 200, and the design apparatus 100 and the manufacturing simulator 300. The communication IF 25 functions as the design drawing information acquisition unit 210 which acquires drawing information, the determination result information acquisition unit 240 which acquires a determination result in the manufacturing simulator 300, and the determination result information output unit 250 which outputs the determination result.

The input/output IF 26 is connected to the display device 27 and the input device 28. The display device 27 is a display such as an LCD on which a drawing is visually recognized as an image. The input device 28 is a device used to give an instruction to the CPU 21, and is a keyboard, a mouse, a touch panel, or the like. The design supporting apparatus 200 may not comprise the display device 27 and/or the input device 28.

In a case where power is supplied, the CPU 21 reads the program or the data stored in the ROM 22 (or the HDD 24), and develops the program or the data on the RAM: 23 in an executable state. The program is executed. Due to the execution of the program, data is exchanged with the HDD 24, the communication IF 25, and the input/output IF 26.

In the above description, the ROM 22, the RAM 23, and the HDD 24 are provided, and any of the ROM 22, the RAM 23, and the HDD 24 may be configured with a rewritable nonvolatile memory. As the rewritable nonvolatile memory, a flash memory or the like may be used. The ROM 22 and the RAM 23 may be configured integrally with the CPU 21. In this case, the ROM 22 and the RAM 23 may be configured with rewritable nonvolatile memories. As the rewritable nonvolatile memories, flash memories or the like may be used.

In the above description, the design supporting apparatus 200 operates as a computer which is an apparatus processing information according to the application software (program) held in the ROM 22 or the HDD 24. In this case, the respective units (the design change location specifying unit 220 and the facility information acquisition unit 230) of the design supporting apparatus 200 illustrated in FIG. 1 are configured according to the application software (program) developed in an executable form on the RAM 23, and thus the function of the design supporting apparatus 200 is realized.

As described above, the design apparatus 100 operated by the designer also has the same hardware configuration as the hardware configuration illustrated in FIG. 2. The display device 120 connected to the design apparatus 100 corresponds to the display device 27 in FIG. 2, and the input device 130 connected to the design apparatus 100 corresponds to the input device 28 in FIG. 2.

As described above, in a case where the function of the design supporting apparatus 200 is incorporated into the design apparatus 100 as application software, the application software for realizing the function of the design supporting apparatus 200 is held in the ROM 22 or the HDD 24 along with the application software for realizing the function of the design apparatus 100. The application software for realizing the function of the manufacturing simulator 300 may be incorporated into the design supporting apparatus 200. The application software for realizing the function of the design supporting apparatus 200 and the function of the manufacturing simulator 300 may be incorporated into the design apparatus 100.

The HDD 24 may also have the function of the facility information DB 400.

Facility Information Accumulated in Facility Information DB 400

The facility information DB 400 accumulates information (facility information) regarding a facility correlated with each work process in a manufacturing line for manufacturing a product. The facility information includes information regarding a facility manufacturing a product (current product) before a design change, a copable range with the facility, a replaceable tool or component used for the facility, and a correction with the replaceable tool or component. The replaceable tool or component is a currently possessed tool or component.

FIG. 3 is a diagram illustrating an example of facility information accumulated in the facility information DB 400. FIG. 3 illustrates accumulated facility information in a table form. Herein, as an example, it is assumed that a manufacturing line is configured with work processes respectively including a lathe A, a milling machine, and a drilling machine as facilities.

FIG. 3 illustrates a facility, a tool or a component (tool/component), a range, a processing target member (workpiece), a size of a workpiece, and a processing state (processing). Regarding the "facility", the lathe A, the milling machine, and the drilling machine are illustrated. Regarding the "tool/component", a tool or a component which is currently in use (indicated by "current"), and a replaceable tool or component (indicated by "replacement") are illustrated. Regarding the "range", a numerical value or the like illustrated on the right part indicates a range of processing at the current time (product), or a copable range (copable range) in a replaceable tool or component. Regarding the "workpiece", a shape of a processing target member is illustrated. Regarding the "size of workpiece", a size of a workpiece in a case of a product and a range of a size of a workpiece which can be processed in a case of a copable range are illustrated. Regarding the "processing", a processing state in a case of a product, and a range of processing in a case of a copable range are illustrated.

Hereinafter, with reference to FIG. 3, each of the lathe A, the milling machine, and the drilling machine will be described.

(1) Lathe A

With respect to a product (current product) before a design change, cutting by 12 mm is performed on a round bar as a workpiece having the length of 220 mm and the diameter of 50 mm by using the lathe A attached with a right single-edged bite A. A copable range of the right single-edged bite A is cutting by up to 20 mm for a round bar having maxima of the length of 250 mm and the diameter of 80 mm.

With respect to a round bar A having maxima of the length of 250 mm and the diameter of 80 mm, a copable range through replacement of a tool or a component is cutting by up to 40 mm through replacement with a right single-edged bite B, cutting by up to 20 mm through replacement with a protruding blade bite, or cutting by up to 50 mm through replacement with a boring bar tool.

(2) Milling machine

With respect to a product (current product) before a design change, grooving by 2 mm wide and 2 mm deep is performed on a plate member having the width of 300 mm, the length of 200 mm, and the thickness of 7 mm. A copable range of the milling machine is grooving by up to 5 mm deep at 2 mm wide for a plate member having the width of 10 to 900 mm, the length of 10 to 600 mm, and the thickness of 5 to 40 mm.

A copable range through replacement of a tool or a component is grooving by up to 5 mm deep at 1 mm wide. Another copable range through replacement of a tool or a component is grooving by up to 10 mm deep at 3 mm wide.

(3) Drilling machine

With respect to a product (current product) before a design change, boring by 20 mm deep is performed on a plate member by using a drill bit having the diameter of 10 mm. A copable range of the drill bit having the diameter of 10 mm is boring by up to 50 mm deep.

A copable range through replacement of a tool or a component is boring by up to 50 mm deep through replacement with a drill bit having the diameter of 0.5 mm, boring by up to 30 mm deep through replacement with a drill bit having the diameter of 1.0 mm, and boring by up to 30 mm deep through replacement with a drill bit having the diameter of 1.5 mm. A copable range through replacement of a tool or a component is boring by up to 50 mm deep through replacement with a drill bit having the diameter of 2.0 mm, boring by up to 50 mm deep through replacement with a drill bit having the diameter of 2.5 mm, and boring by up to 100 mm deep through replacement with a drill bit having the diameter of 15.0 mm. A copable range through replacement of a tool or a component is boring by up to 15 mm deep through replacement with a hole cutter having the diameter of 30.0 mm, boring by up to 30 mm deep through replacement with a hole cutter having the diameter of 50.0 mm, and boring by up to 100 mm deep through replacement with a hole cutter having the diameter of 100.0 mm. A copable range through replacement of a tool or a component is boring by up to 15 mm deep through replacement with a circle cutter having the diameter of 40 to 200 mm.

Flowchart

Next, a description will be made of an operation of the design system 1 according to a flowchart. Herein, the description will be made focusing on the design supporting apparatus 200 and the manufacturing simulator 300.

Figure 4:
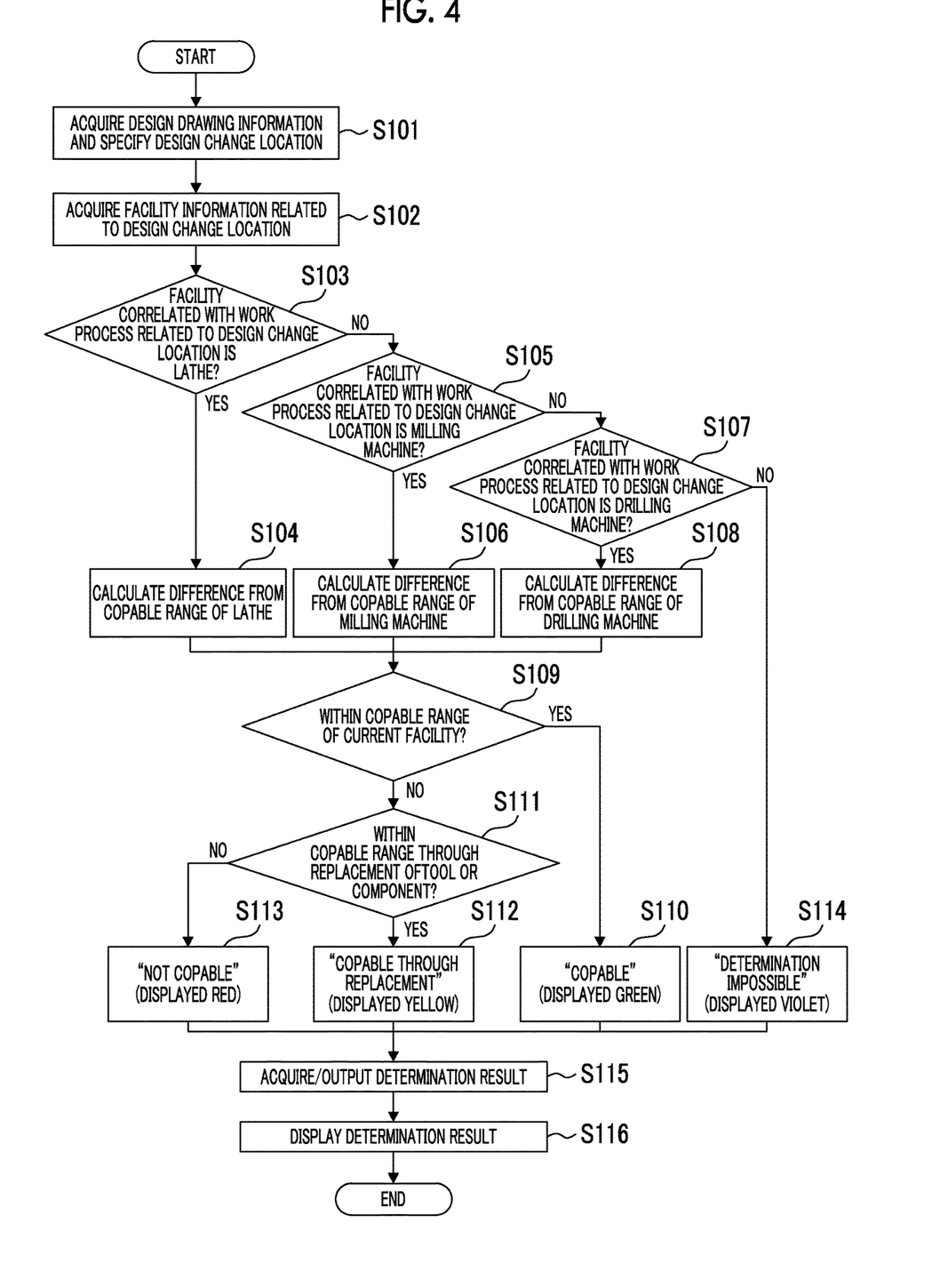
FIG. 4 is a flowchart for explaining an operation of the design system in a case where facilities are a lathe, a milling machine, and a drilling machine.

FIG. 4 is a flowchart for explaining an operation of the design system 1 in a case where facilities area lathe, a milling machine, and a drilling machine.

Hereinafter, the flowchart in FIG. 4 will be described while referring to the design system 1 illustrated in FIG. 1.

First, the design drawing information acquisition unit 210 of the design supporting apparatus 200 acquires design drawing information from the design apparatus 100, and the design change location specifying unit 220 specifies a design change location (step S101 which is indicated by S101 in FIG. 4; the same applies hereinafter).

Then, the facility information acquisition unit 230 acquires facility information related to the design change location from the facility information DB 400 on the basis of information (design change location information) regarding the specified design change location (step S102).

Here, it is determined whether or not a facility correlated with a work process related to the design change is a "lathe" on the basis of the design change location information specified by the design change location specifying unit 220 and the facility information related to the design change acquired by the facility information acquisition unit 230 (step S103). In a case where a determination result in step S103 is affirmative (YES), that is, in a case where the facility correlated with the work process related to the design change is a "lathe", the manufacturing simulator 300 calculates a difference between the design change location and a copable range of the current lathe (a difference from a copable range of the lathe) (step S104).

On the other hand, in a case where a determination result in step S103 is negative (NO), that is, in a case where the facility correlated with the work process related to the design change is not a "lathe", it is determined whether or not the facility correlated with the work process related to the design change is a "milling machine" (step S105). In a case where a determination result in step S105 is affirmative (YES), that is, in a case where the facility correlated with the work process related to the design change is a "milling machine", the manufacturing simulator 300 calculates a difference between the design change location and a copable range of the current milling machine (a difference from a copable range of the milling machine) (step S106).

On the other hand, in a case where a determination result in step S105 is negative (NO), that is, in a case where the facility correlated with the work process related to the design change is not a "milling machine", it is determined whether or not the facility correlated with the work process related to the design change is a "drilling machine" (step S107). In a case where a determination result in step S107 is affirmative (YES), that is, in a case where the facility correlated with the work process related to the design change is a "drilling machine", the manufacturing simulator 300 calculates a difference between the design change location and a copable range of the current drilling machine (a difference from a copable range of the drilling machine) (step S108).

In a case where a determination result in step S107 is negative (NO), that is, in a case where the facility correlated with the work process related to the design change is not a "drilling machine", "determination impossible" is determined (step S114). This case is a case where the facility correlated with the work process related to the design change is not any of a "lathe", a "milling machine", and a "drilling machine".

The manufacturing simulator 300 determines whether or not the difference from the copable range of the lathe calculated in step S104, the difference from the copable range of the milling machine calculated in step S106, and the difference from the copable range of the drilling machine calculated in step S108 are within a copable range with the current facility ("current" in the column of tool/component in FIG. 3) (step S109). In a case where a determination result in step S109 is affirmative (YES), that is, in a case where the difference is within a copable range with the current facility in the manufacturing line, "copable" is determined (step S110).

On the other hand, in a case where a determination result in step S109 is negative (NO), that is, in a case where the difference is not within a copable range with the current facility in the manufacturing line, it is determined whether or not the difference is within a copable range ("replacement" in the column of tool/component in FIG. 3) through replacement of a tool or a component (step S111). In a case where a determination result in step S111 is affirmative (YES), that is, in a case where the difference is within a copable range through replacement of a tool or a component, "copable through replacement" is determined (step S112).

In a case where a determination result in step S111 is negative (NO), that is, in a case where the difference is not within a copable range through replacement of a tool or a component, "not copable" is determined (step S113).

The determination result information acquisition unit 240 of the design supporting apparatus 200 acquires information regarding a result (determination result) of each determination from the manufacturing simulator 300, and the determination result information output unit 250 outputs the determination result to the design apparatus 100 (step S115). A display result from the design apparatus 100 is displayed in colors in a determination result display region (a determination result display region 122 of the display screen 121 illustrated in FIG. 5A or the like which will be described later) provided in a display screen (the display screen 121 illustrated in FIG. 5A) of the display device 120 (step S116). Displayed colors are illustrated along with determination results in steps S110, S112, S113, and S114.

Hereinafter, a description will be made of an Example with a "wooden doll" as a product (commodity).

Figure 5A:
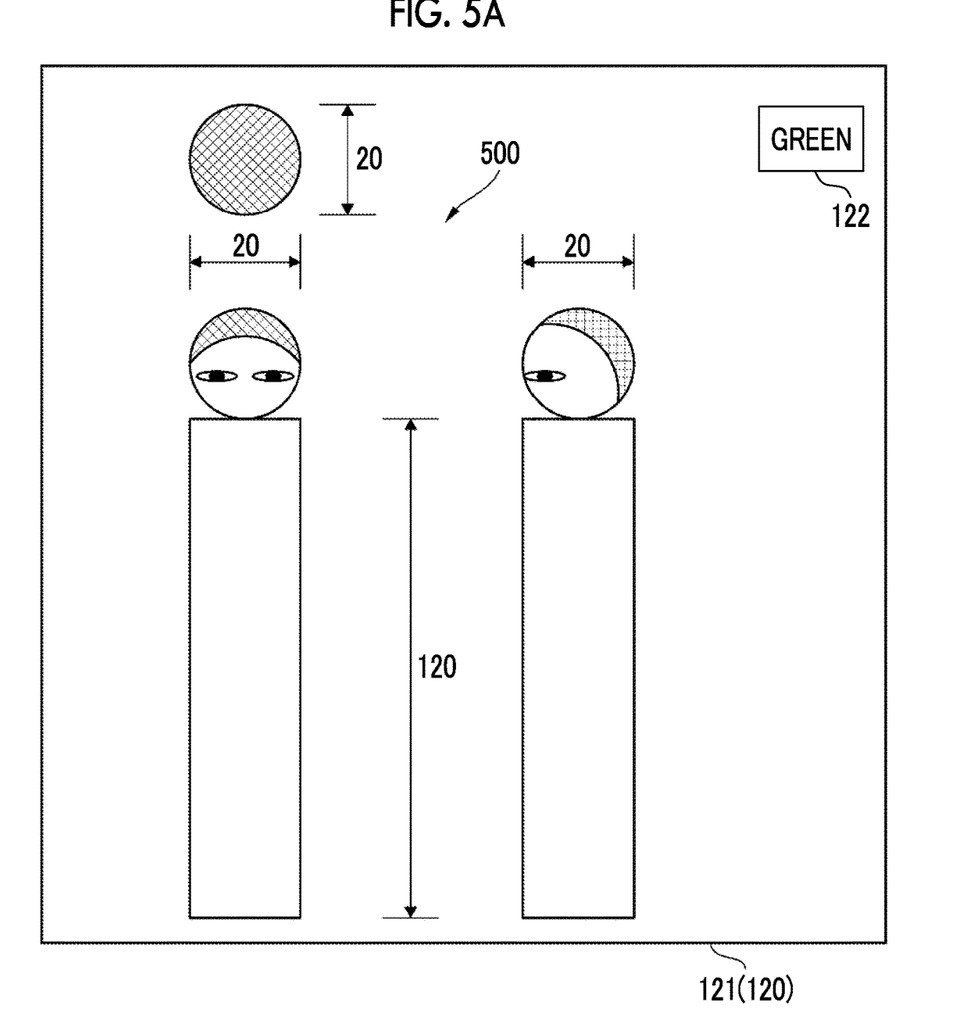
Figure 5B:
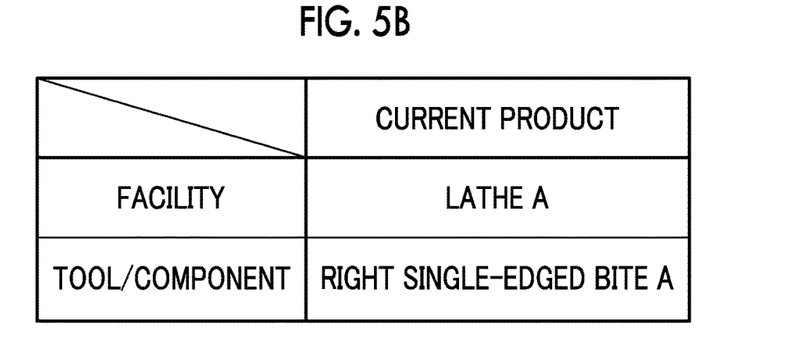

Current Product FIGS. 5A and 5B are diagrams for explaining a wooden doll 500 which is the current product. FIG. 5A illustrates three orthographic views displayed on the display screen 121 of the display device 120, and FIG. 5B illustrates a facility and the like used for manufacturing. The three orthographic views in FIG. 5A correspond to a design drawing of the wooden doll 500, and are a front view, a side view, and a top view. The unit of a dimension is mm. The determination result display region 122 is provided in the display screen 121 of the display device 120 as illustrated in FIG. 5A.

As illustrated in FIG. 5A, the wooden doll 500 has a spherical head and a cylindrical body. As illustrated in FIG.

5B, the wooden doll 500 is manufactured by using the right single-edged bite A (the right single-edged bite A in FIG. 3) in the lathe A (the lathe A in FIG. 3). A design change is not performed on the current product, and thus "green" indicating "copable" is displayed in the determination result display region 122.

Design change 1

Next, it is assumed that a design change is performed on the wooden doll 500, and thus a wooden doll 510 is designed.

Figure 6A:
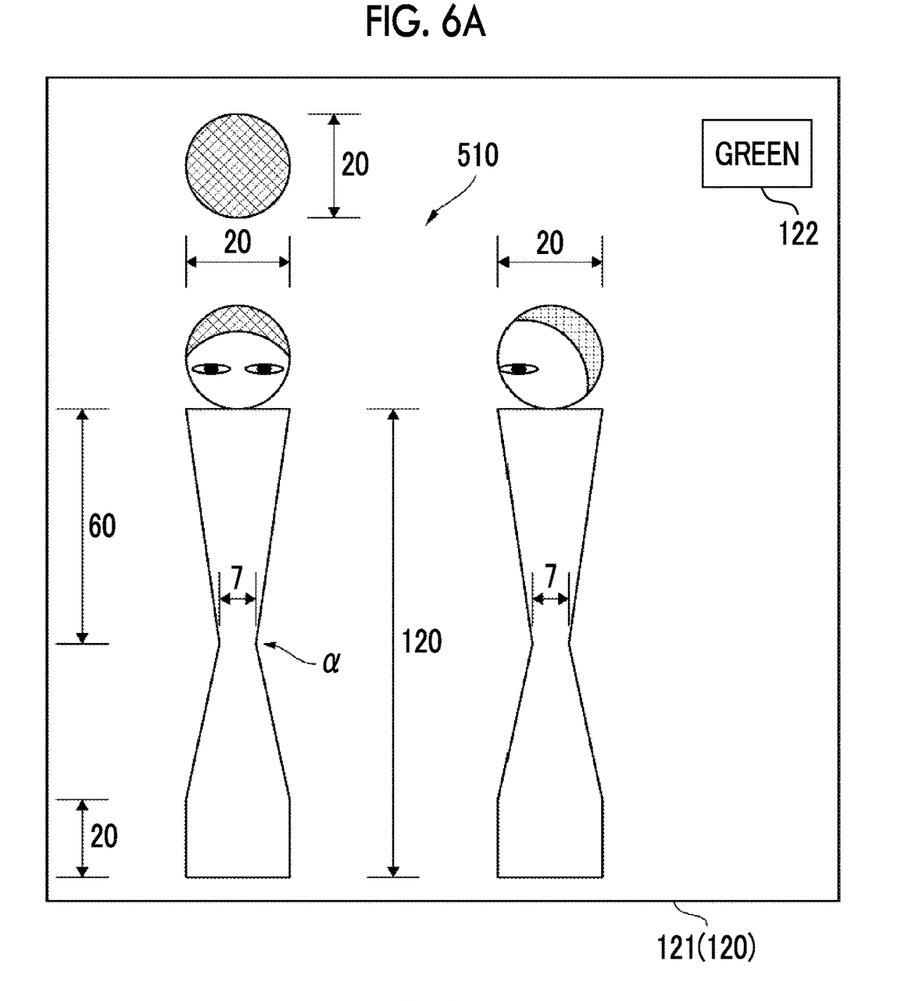
Figure 6B:
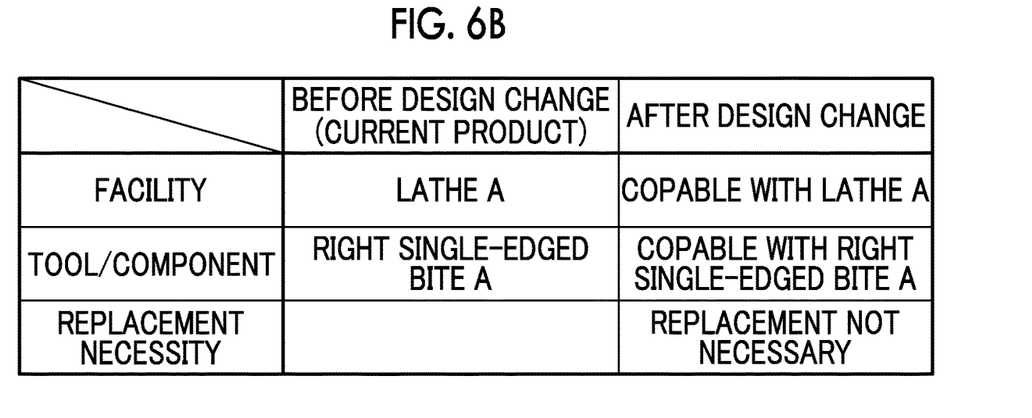

FIGS. 6A and 6B are diagrams for explaining the wooden doll 510 having undergone the design change. FIG. 6A illustrates three orthographic views displayed on the display screen 121 of the display device 120, and FIG. 6B illustrates a facility and the like before and after the design change. The three orthographic views in FIG. 6A correspond to a design drawing of the wooden doll 510, and are a front view, a side view, and a top view. The unit of a dimension is mm. FIG. 6B illustrates the facility and the like used for manufacturing of the wooden doll 500 before the design change and a facility and the like used for manufacturing of the wooden doll 510 after the design change.

As illustrated in FIG. 6A, the wooden doll 510 has a spherical head and a cylindrical body in which the center (waist) thereof in a longitudinal direction is thinned. In this case, the design change location specifying unit 220 specifies that a design change location is a portion α where the center (waist) of the body is thinned on the basis of a difference between the design drawings in FIGS. 5A and 6A (step S101 in FIG. 4). The facility information acquisition unit 230 specifies that a facility correlated with a work process related to the design change location is the lathe A (step S102). Then, the manufacturing simulator 300 determines whether or not the thinned portion α of the body is within a copable range with the current facility (step S109). In this case, the thinned portion α of the body can be coped with by the lathe A, and can also be coped with by the right single-edged bite A, and thus replacement of a tool or a component is not necessary. Therefore, the manufacturing simulator 300 determines "copable" (step S110).

Therefore, the determination result display region 122 provided in the display screen 121 of the display device 120 of the design apparatus 100 is maintained to be displayed "green" (step S116).

Design change 2

Next, it is assumed that a design change is performed on the wooden doll 500, and thus a wooden doll 520 is designed.

Figure 7A:
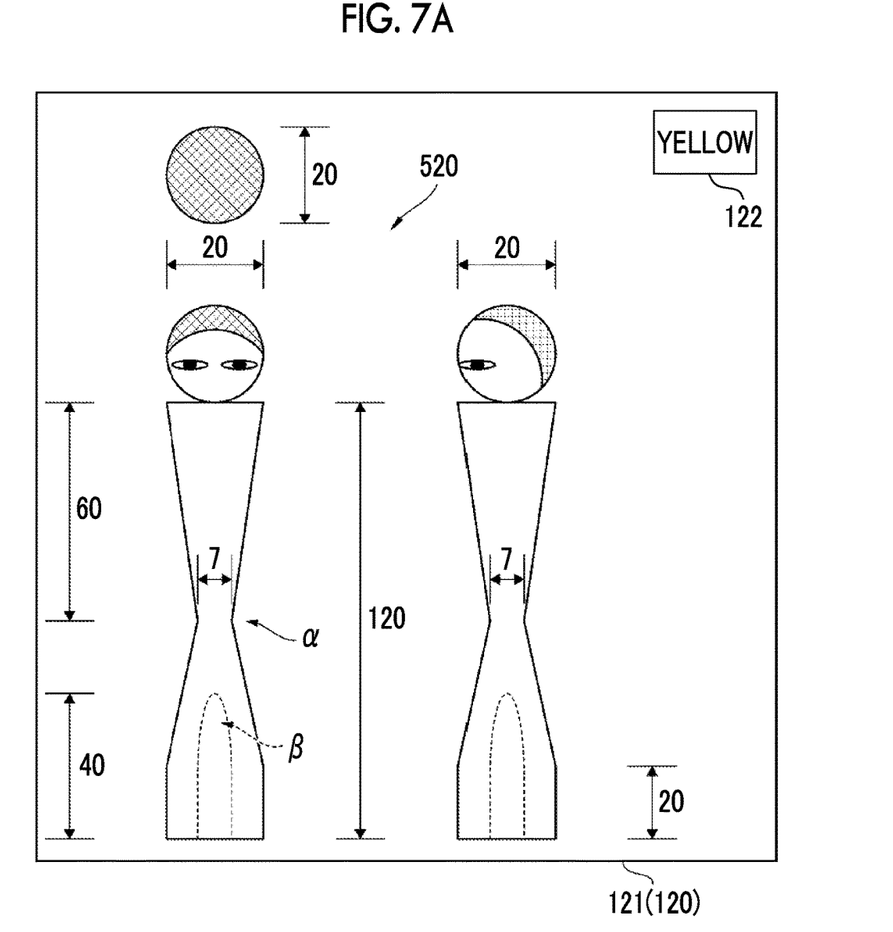
Figure 7B:
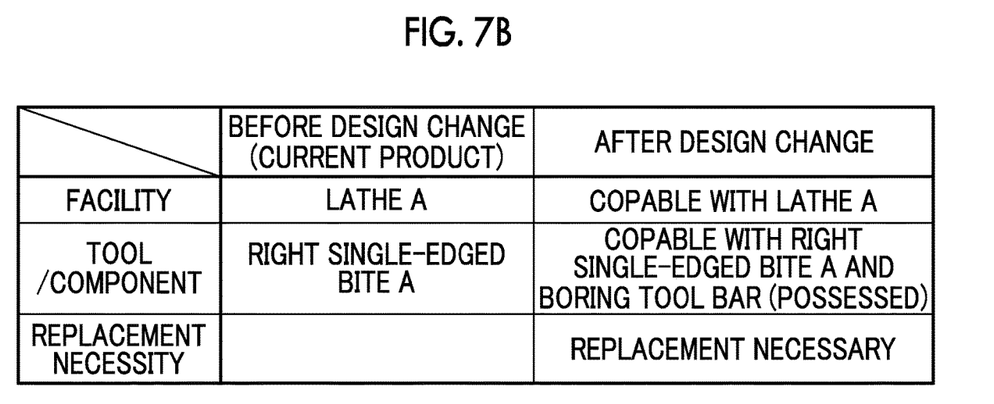

FIGS. 7A and 7B are diagrams for explaining the wooden doll 520 having undergone the design change. FIG. 7A illustrates three orthographic views displayed on the display screen 121 of the display device 120, and FIG. 7B illustrates a facility and the like before and after the design change. The three orthographic views in FIG. 7A correspond to a design drawing of the wooden doll 520, and are a front view, a side view, and a top view. The unit of a dimension is mm. FIG. 7B illustrates the facility and the like used for manufacturing of the wooden doll 500 before the design change and a facility and the like used for manufacturing of the wooden doll 520 after the design change.

As illustrated in FIG. 7A, the wooden doll 520 has a spherical head and a cylindrical body in which the center (waist) thereof in a longitudinal direction is thinned. The body is hollowed from the lower side. In this case, the design change location specifying unit 220 specifies that design change locations are a portion α where the center (waist) of the body is thinned and a portion β hollowed from the lower side of the body on the basis of a difference between the design drawings in FIGS. 5A and 7A (step S101 in FIG. 4). The facility information acquisition unit 230 specifies that a facility correlated with a work process related to the design change locations is the lathe A (step S102). Then, the manufacturing simulator 300 determines whether or not the thinned portion α and the hollowed portion β of the body are within a copable range with the current facility (step S109). In this case, the thinned portion α of the body can be coped with by the lathe A, and can also be coped with by the right single-edged bite A, and thus replacement of a tool or a component is not necessary. However, the hollowed portion β from the lower side cannot be processed by the right single-edged bite A attached to the lathe A, and is thus required to be processed through replacement with the possessed boring bar tool. Therefore, the manufacturing simulator 300 determines "copable through replacement" (step S112).

Therefore, the determination result display region 122 provided in the display screen 121 of the display device 120 of the design apparatus 100 is changed from "green" to "yellow" (step S116).

Design change 3

Next, it is assumed that a design change is performed on the wooden doll 500, and thus a wooden doll 530 is designed.

Figure 8A:
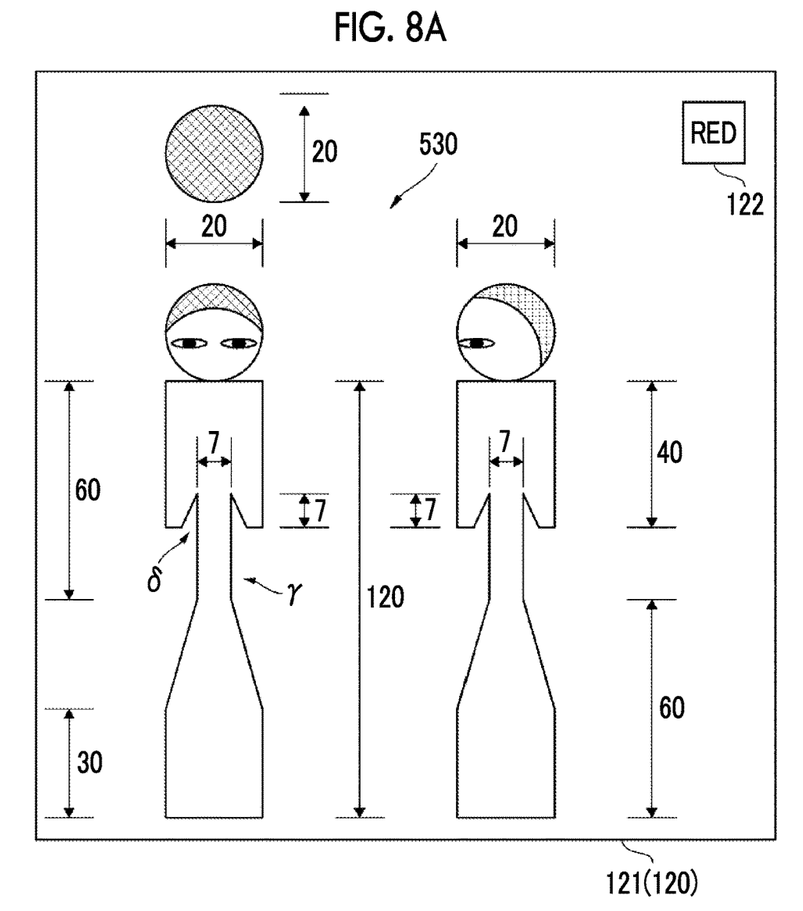
Figure 8B:
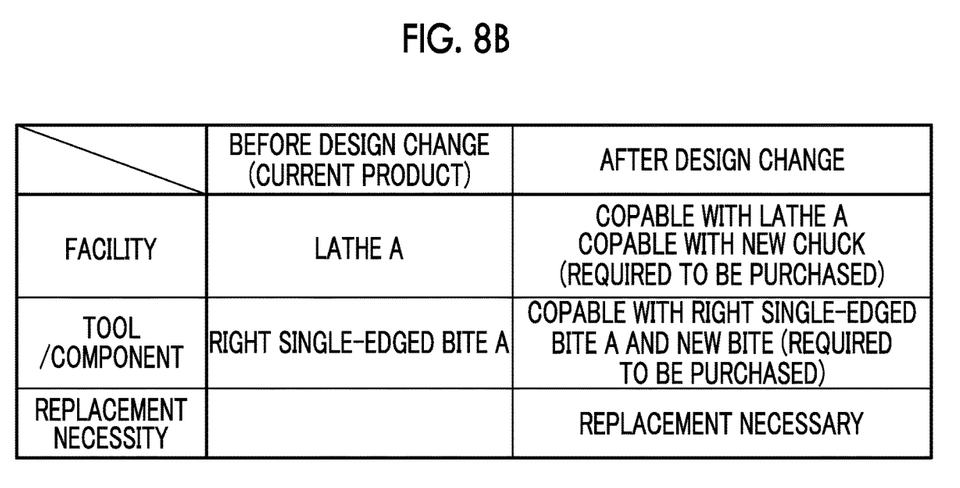

FIGS. 8A and 8B are diagrams for explaining the wooden doll 530 having undergone the design change. FIG. 8A illustrates three orthographic views displayed on the display screen 121 of the display device 120, and FIG. 8B illustrates a facility and the like before and after the design change. The three orthographic views in FIG. 8A correspond to a design drawing of the wooden doll 530, and are a front view, a side view, and a top view. The unit of a dimension is mm. FIG. 8B illustrates the facility and the like used for manufacturing of the wooden doll 500 before the design change and a facility and the like used for manufacturing of the wooden doll 530 after the design change.

As illustrated in FIG. 8A, the wooden doll 530 has a spherical head and a cylindrical body. The body is thinned at the center (waist) in the longitudinal direction, and an armpit is dug. In this case, the design change location specifying unit 220 specifies that design change locations are a portion γ where the center (waist) of the body is thinned and a portion δ where the armpit is dug on the basis of a difference between the design drawings in FIGS. 5A and 8A (step S101 in FIG. 4). The facility information acquisition unit 230 specifies that a facility correlated with a work process related to the design change location is the lathe A (step S102). Then, the manufacturing simulator 300 determines whether or not the portion γ where the center (waist) of the body is thinned and the portion δ where the armpit is dug are within a copable range with the current facility (step S109). In this case, processing of the portion γ where the center (waist) of the body is thinned and the portion δ where the armpit is dug cannot be coped with by the current right single-edged bite A, and cannot also be coped with by other possessed bites. In other words, it is understood that a new bite is required to be purchased, and thus a new chuck is also required to be purchased. Therefore, the manufacturing simulator 300 determines "not copable" (step S113).

Therefore, the determination result display region 122 provided in the display screen 121 of the display device 120 of the design apparatus 100 is changed from "green" to "red" (step S116).

Design change 4

Next, it is assumed that a design change is performed on the wooden doll 500, and thus a wooden doll 540 is designed.

Figure 9A:
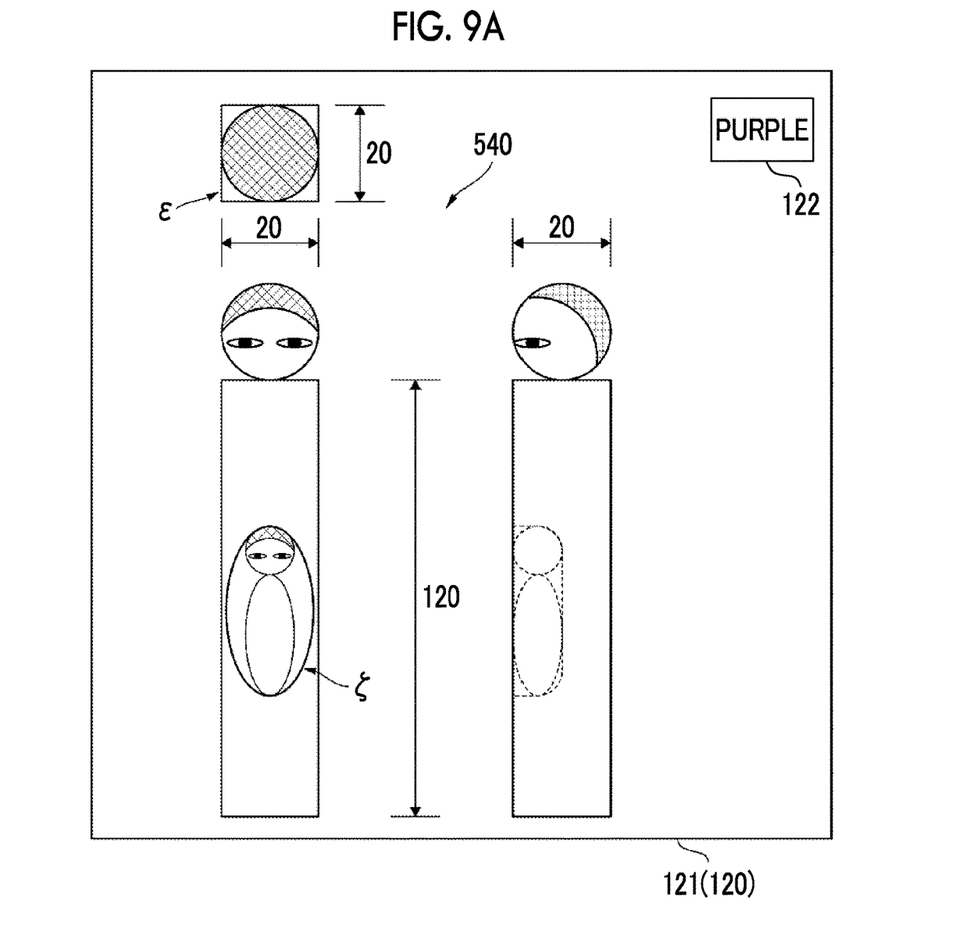
Figure 9B:
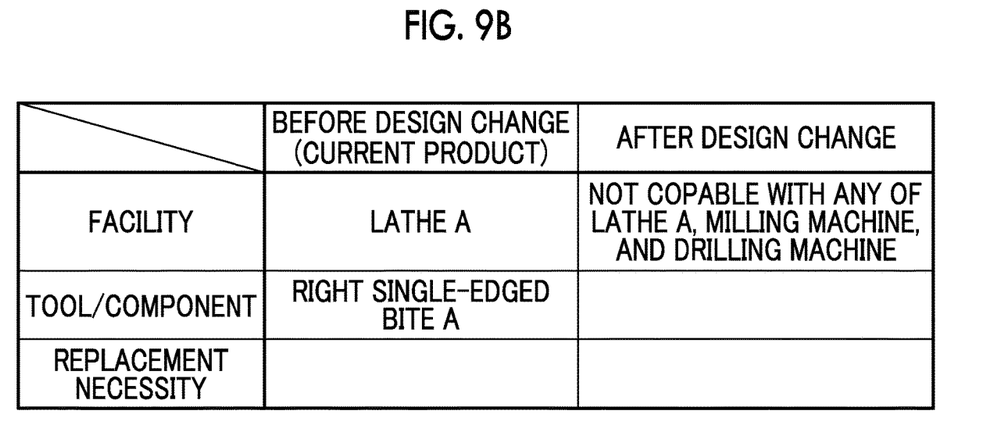

FIGS. 9A and 9B are diagrams for explaining the wooden doll 540 having undergone the design change. FIG. 9A illustrates three orthographic views displayed on the display screen 121 of the display device 120, and FIG. 9B illustrates a facility and the like before and after the design change. The three orthographic views in FIG. 8A correspond to a design drawing of the wooden doll 540, and are a front view, a side view, and a top view. The unit of a dimension is mm. FIG. 9B illustrates the facility and the like used for manufacturing of the wooden doll 500 before the design change and a facility and the like used for manufacturing of the wooden doll 540 after the design change.

As illustrated in FIG. 9A, the wooden doll 540 has a spherical head and a prismatic body. One surface of the prism of the body in a longitudinal direction is embedded with a small wooden doll. In this case, the design change location specifying unit 220 specifies that design change locations are a prism portion δ of the body and a small wooden doll C provided on one surface of the prism in the longitudinal direction on the basis of a difference between the design drawings in FIGS. 5A and 9A (step S101 in FIG. 4). The facility information acquisition unit 230 specifies that a facility correlated with a work process related to the design change location is the lathe A (step S102). Then, the manufacturing simulator 300 determines whether or not the prism portion δ of the body and the small wooden doll C provided on one surface of the prism in the longitudinal direction are within a copable range with the current facility (step S109). In this case, processing of the prism portion δ of the body and the small wooden doll C provided on one surface of the prism in the longitudinal direction cannot be coped with by the lathe A, and cannot also be coped with by the milling machine or the drilling machine which is a possessed facility. Therefore, the manufacturing simulator 300 determines "determination impossible" (step S114).

Therefore, the determination result display region 122 provided in the display screen 121 of the display device 120 of the design apparatus 100 is changed from "green" to "violet" (step S116).

As described above, by using the design supporting apparatus 200, in a design stage before a design change is completed, a designer can understand whether or not the design change to be performed is within a copable range with the current facility or is within a copable range through replacement of a tool or a component possessed in the current facility. Therefore, it is possible to prevent a design change which is not within a copable range with the current facility from being unintentionally performed.

The program may cause a computer to function as an acquisition unit that acquires information regarding a design change, and an output unit that outputs information indicating that the design change can be coped with in a case where the design change can be coped with through replacement of a tool or a component with respect to the current facility in a manufacturing line, and outputs information indicating that the design change cannot be coped with in a case where the design change cannot be coped with even through replacement of the tool or the component with respect to the current facility in the manufacturing line. In this case, the program may be stored on a storage medium so as to be provided, and may be provided by communication means. In this case, the invention may be understood as a "non-transitory computer readable medium storing the program".

The "non-transitory computer readable medium storing the program" indicates a computer readable recording medium used to install or execute the program or to distribute the program.

The recording medium includes a digital versatile disk (DVD), a compact disk (CD), a Blu-ray (registered trademark) disk, a magnetooptical disk (MO), a flexible disk (FD), a magnetic tape, an HDD, a ROM, and a flash memory, based on standards defined by forums.

As mentioned above, the exemplary embodiment of the invention has been described. Various modifications or alternations of configurations without departing from the scope of the technical spirit of the invention are included in the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A design supporting apparatus comprising:
a processor configured to:
acquire information regarding a design change including information regarding a design drawing before the design change and information regarding a design drawing after the design change;
extract a difference between the information regarding the design drawings before and after the design change, and specify the difference as a design change location;
acquire facility information regarding a facility in a current manufacturing line related to the design change location from facility information accumulated in a facility information database;
determine whether or not the design change exceeds a copable range through replacement of a tool or a component with respect to the facility from information regarding the design change location and the facility information;
output information indicating that the design change is able to be coped with through replacement of the tool or the component with respect to the facility in the current manufacturing line in a case where the design change does not exceed the copable range, and output information indicating that the design change is not able to be coped with even through replacement of the tool or the component with respect to the facility in the current manufacturing line in a case where the design change exceeds the copable range; and
display, on a display screen, the output information indicated by a color of a determination result display box provided on the display screen on which the design drawing after the design change is displayed.

2. The design supporting apparatus according to claim 1, wherein the current manufacturing line includes a plurality of work processes, and the facility in the current manufacturing line is correlated with each work process, and wherein the facility in the current manufacturing line is a facility corresponding to a work process specified by the information regarding the design change.

3. The design supporting apparatus according to claim 1, wherein the processor further displays the design drawing after the design change on a display, and
wherein the processor outputs information indicating that the design change is not able to be coped with such that the information indicating that design change is able to be coped with or the information indicating that the design change is not able to be coped with is displayed along with the design drawing after the design change.

4. A non-transitory computer readable medium storing a program causing a computer to:
acquire information regarding a design change including information regarding a design drawing before the design change and information regarding a design drawing after the design change;
extract a difference between the information regarding the design drawings before and after the design change, and specify the difference as a design change location;
acquire facility information regarding a facility in a current manufacturing line related to the design change location from facility information accumulated in a facility information database;
determine whether or not the design change exceeds a copable range through replacement of a tool or a component with respect to the facility from information regarding the design change location and the facility information;
output information indicating that the design change is able to be coped with through replacement of the tool or the component with respect to the facility in the current manufacturing line in a case where the design change does not exceed the copable range, and output information indicating that the design change is not able to be coped with even through replacement of the tool or the component with respect to the facility in the current manufacturing line in a case where the design change exceeds the copable range; and display, on a display screen, the output information indicated by a color of a determination result display box provided on the display screen on which the design drawing after the design change is displayed.

5. A design supporting apparatus comprising:
acquisition means for acquiring information regarding a design change including information regarding a design drawing before the design change and information regarding a design drawing after the design change;
means for extracting a difference between the information regarding the design drawings before and after the design change, and specifying the difference as a design change location;
means for acquiring facility information regarding a facility in a current manufacturing line related to the design change location from facility information accumulated in a facility information database;
means for determining whether or not the design change exceeds a copable range through replacement of a tool or a component with respect to the facility from information regarding the design change location and the facility information;
output means for outputting information indicating that the design change is able to be coped with through replacement of the tool or the component with respect to the facility in the current manufacturing line in a case where the design change does not exceed the copable range, and outputting information indicating that the design change is not able to be coped with even through replacement of the tool or the component with respect to the facility in the current manufacturing line in a case where the design change exceeds the copable range; and
means for displaying, on a display screen, the output information indicated by a color of a determination result display box provided on the display screen on which the design drawing after the design change is displayed.

* * * * *